United States Patent [19]

Tomita et al.

[11] 4,344,087
[45] Aug. 10, 1982

[54] METHOD OF PROCESSING VIDEO SIGNALS FOR TIME BASE CORRECTION

[75] Inventors: Masao Tomita, Neyagawa; Takenobu Isaka, Moriguchi; Kiyoji Fujisawa, Nara; Mineo Mino, Hirakata, all of Japan

[73] Assignee: Matsushita Electric Industrial Co., Ltd., Kadoma, Japan

[21] Appl. No.: 98,199

[22] Filed: Nov. 27, 1979

[30] Foreign Application Priority Data

Dec. 1, 1978 [JP] Japan .................. 53-149331

[51] Int. Cl.³ .................. H04N 5/76; H04N 5/795
[52] U.S. Cl. .................. 358/127; 360/10; 360/36; 360/37; 358/158; 358/195.1; 358/159
[58] Field of Search .................. 360/36, 10, 37; 358/148, 158, 127, 195.1, 159

[56] References Cited

U.S. PATENT DOCUMENTS

| | | | |
|---|---|---|---|
| 3,984,867 | 10/1976 | Harnandez | 360/36 |
| 4,081,834 | 3/1978 | Takamiya | 358/158 |
| 4,104,684 | 8/1978 | Wakami | 360/70 |
| 4,126,886 | 11/1978 | Takahara | 360/37 |

Primary Examiner—Vincent P. Canney
Assistant Examiner—Alan Faber
Attorney, Agent, or Firm—Wenderoth, Lind & Ponack

[57] ABSTRACT

A method of processing video signals for eliminating vertical picture fluctuations caused when a video tape recorder reproduces video signals at a tape speed different from that used for recording the video signals. The vertical picture fluctuations are eliminated by substituting distorted vertical synchronous signals for the original vertical synchronous signal, the distorted vertical synchronous signals generated by a processing apparatus having a correction circuit which corrects for the difference in frequency characteristics between the video signal path and the vertical synchronous signal path.

6 Claims, 7 Drawing Figures

UPON STILL PICTURE REPRODUCTION

UPON 1/5 SLOW MOTION REPRODUCTION

METHOD OF PROCESSING VIDEO SIGNALS FOR TIME BASE CORRECTION

BACKGROUND OF THE INVENTION

1. Field of the Invention

This invention relates to a method of processing video signals for eliminating vertical picture fluctuations which appear upon the monitoring of video signals by a television receiver, such signals being reproduced by a video tape recorder (which will simply be called VTR hereinafter) at a tape speed different from that used for recording, so as to obtain stable reproduction pictures.

2. Description of the Prior Art

Generally in helical scanning type VTR's using rotary heads, the slopes of the traces of the scanning rotary heads upon reproduction are different from the slopes of the tracks scanningly recorded by the rotary heads, when the reproduction is a slow motion reproduction, a still picture reproduction or quick motion reproduction which is performed at a tape transportation speed different from that used during recording. For example, in a VTR wherein the tape scanning direction of the rotary head is the same as that of the tape transportation, the slopes of the scanning traces of the rotary heads are not steep in the case of slow motion reproduction and still picture reproduction, and are less steep than the recorded tracks. On the contrary, the slopes of the scanning traces upon quick motion reproduction are steep, and are steeper than the recorded tracks. Therefore, upon reproductions in these cases, the heads scan plural recorded tracks in one field of a video signal. So, not only noise bands are produced thereby, but also the number of the horizontal scanning periods (H number) reproduced in each scanning period of the heads becomes different from the H number used during recording. For example, in the case of still picture reproduction by a VTR for azimuth recording which performs an H number adjustment of 1.5H, the information corresponding to 264H are reproduced in one scanning period of the heads. (Usually this should be 262.5H).

In a VTR for azimuth recording, output signals cannot be obtained upon reproduction unless the heads used in recording are identical to those used for reproduction. So, since the H number for reproduction is different from that for recording as mentioned above, the time periods between adjacent vertical synchronous signals in the reproduced video signals become different from those in the recorded video signals. In the above-mentioned example, a time difference of 3H occurs between the adjacent fields. That is, the vertical synchronous signals cycle by 262.5H, 265.5H, 262.5H, 265.5H, . . . , namely by alternating long and short fields. In the slow motion reproduction also, a similar variation of the vertical synchronous signal cycle period occurs. But in this case, such long and short fields do not cycle by adjacent fields in contrast to the case of still picture reproduction. For example, in a 1/5 slow motion reproduction, 5 fields form one cycle. FIGS. 1a and 1b show models of representation cycles of the reproduced vertical synchronous signals during still picture reproduction and 1/5 slow motion reproduction, respectively.

The foregoing descriptions are directed to the case where each rotary head scans plural recorded tracks in each scanning period during reproduction. However, the above described variation of the vertical synchronous signal cycle period occurs quite similarly in the case also when the VTR employs an electric-to-mechanical conversion element for moving each rotary head in a direction perpendicular to the scanning direction thereof so as to perform complete on-tracking, because even in such a case, the H number reproduced in each head scanning period is different from that recorded therein.

If a composite video signal having such variations in vertical synchronous signal cycle periods in applied to a monitoring television receiver, the reproduced picture frames appear to be periodically shifted vertically on the television screen, which is the so called vertical picture fluctuation, resulting in extremely poor pictures, for the following reasons.

FIG. 2 is a block diagram of a main portion of a general television receiver for explaining the relationship between the video signal system and the vertical synchronous signal system thereof. Referring to FIG. 2, a composite video signal containing a time-base fluctuation component $\Phi_f(t)$ caused by the variation of the vertical synchronous signal cycle period (i.e. having different time periods between adjacent vertical synchronous signals) is applied to an input terminal 1 from a VTR. This illustrated portion of the television receiver is divided into a video signal system and a vertical synchronous signal system. The video signal component of the composite video signal is applied to the cathode or the control grid of a cathode ray tube 3 via a video signal amplifier 2. In this case, the time-base fluctuation component $\Phi_f(t)$ is transferred with change to the cathode ray tube 3.

On the other hand, in the vertical synchronous signal system, the vertical synchronous signal component is separated by a vertical synchronous signal separator 4, and is applied to a vertical deflection circuit 7 composed of a vertical deflection signal oscillator 5 and a vertical deflection signal amplifier 6. A blocking oscillator, for example, is used for the vertical deflection signal oscillator 5, and is usually triggered directly by the vertical synchronous signals for producing sawtooth wave signals corresponding to the vertical synchronous signal cycles. This sawtooth wave is amplified by the vertical deflection signal amplifier 6 composed of a vertical deflection driving circuit comprising means for compensating the display linearity and means for adjusting the amplitude of the deflection, and an output circuit. The thus amplified sawtooth is applied to a vertical deflection coil 8 of the cathode ray tube 3 for vertically scanning the electron beam to be applied to the phosphor screen of the cathode ray tube 3. Here, since capacitance coupling and/or transformer coupling are provided between the above described various means in the vertical deflection signal amplifier 6, this amplifier can be considered to have high pass transfer characteristics which cut off d.c. components. Since amplifier 6 also has a limit in its response to very high frequency signals, the vertical deflection circuit 7 can generally be regarded as having band pass transfer characteristics. So, when the input time-base fluctuation component $\Phi_f(t)$ passes through the vertical deflection circuit 7, the time-base fluctuation component is not unchangedly transferred therethrough, but is subjected therein to the time-base processing due to the above described frequency dependent variations in the response of the vertical deflection circuit. Thus, the time-base fluctuation component appears in the vertical deflection coil 8 in the form of $\Phi_o(t)$. As apparent from these, the video signals having the above time-base fluctuation component $\Phi_i(t)$ and the vertical synchronous signals having the time-base fluctuation component $\Phi_o(t)$ produced by the distorting of the time-base fluctuation components by the vertical deflection circuit 7 are mixed at the cathode ray tube 3. So, in the reproduced picture signals, a time difference between the above two time-base fluctuation components occurs, which causes vertical picture fluctuation.

SUMMARY OF THE INVENTION

It is an object of this invention to prevent vertical picture fluctuation on a television screen upon monitoring, by a television receiver, video signals having fluctuating vertical synchronous signal cycle periods. The main point of this invention is to preliminarily subject the vertical synchronous signals to time-base processing, taking into consideration the transfer characteristics of the time-base fluctuation components whose characteristics are inherent to the vertical deflection system of the monitoring television receiver. More specifically, the above object of this invention is achieved according to this invention by providing a method of processing video signals, comprising: processing vertical synchronous signals in a composite video signal to be monitored by a television receiver, the time periods between adjacent ones of said vertical synchronous signals being variable; and supplying to the television receiver the composite video signal having substituted therein the thus processed vertical synchronous signals, said processing of the vertical synchronous signals being performed by a vertical synchronous signal processing apparatus comprising: a separation circuit for separating the vertical synchronous signals from the composite video signal; time-to-voltage conversion circuit for converting the separated vertical synchronous signals to converted signals having amplitudes corresponding to the time periods between the vertical synchronous signals; a correction circuit for correcting amplitudes and phases of the converted signals in accordance with the frequencies of the converted signals; and voltage-to-time conversion circuit for converting the information corresponding to the thus corrected amplitudes to time information.

DESCRIPTION OF THE PREFERRED EMBODIMENT

Figure 1A:
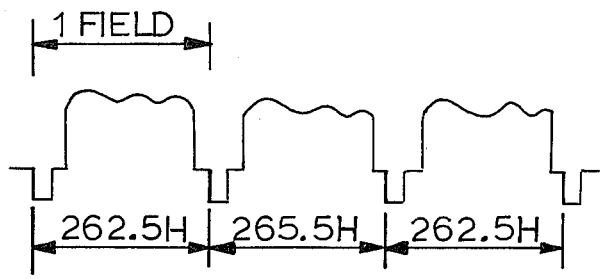
FIGS. 1a and 1b show models of representative cycles of the reproduced vertical synchronous signals during still picture reproduction and 1/5 slow motion reproduction, respectively.
Figure 1B:
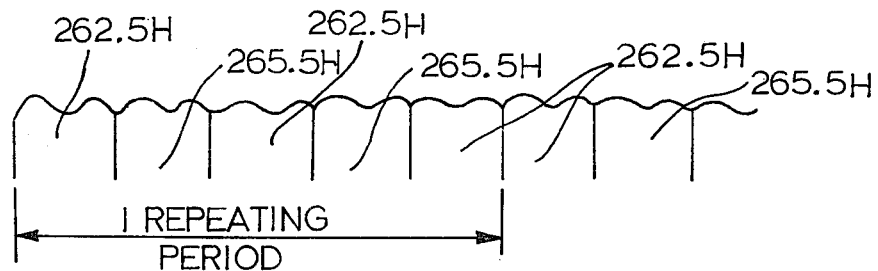
Figure 2:
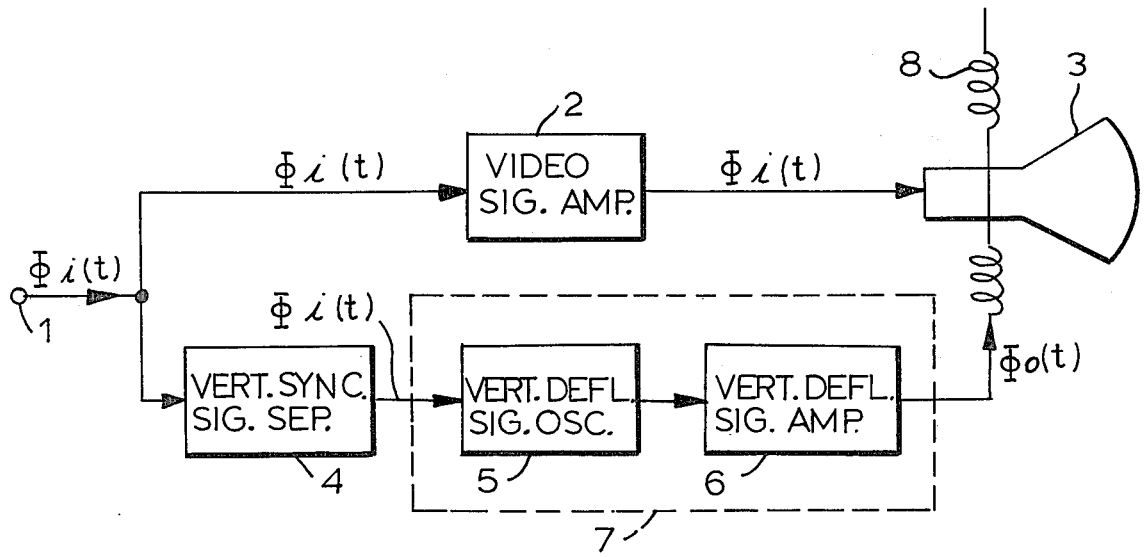
FIG. 2 is a block diagram of a general television receiver.
Figure 3:
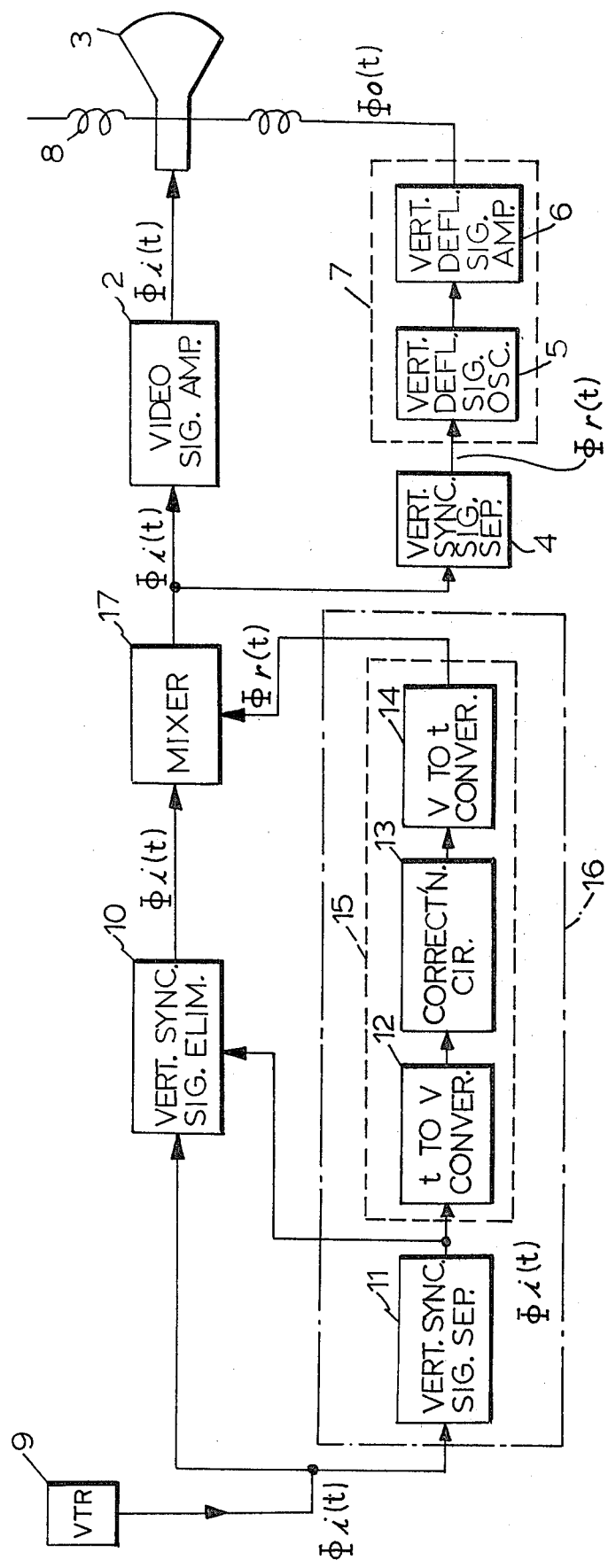
FIG. 3 is a block diagram of the basic structure of an example of the present invention.

This invention will be described hereinafter with reference to the example shown in the drawings. FIG. 3 is a block diagram of the basic structure of an example of this invention, wherein the elements of a monitoring television shown in FIG. 2 are designated by the same reference numerals therein for enabling easy understanding. Referring to FIG. 3, signals reproduced from a VTR 9 are produced e.g. by slow motion reproduction and contain fluctuations of the vertical synchronous signal cycle periods, as shown in FIG. 1(b), and are divided into a video signal system and a synchronous signal system. The video signals are fed to a mixer 17 via a vertical synchronous signal elimination circuit 10. The vertical synchronous signals are fed to the mixer 17 via a vertical synchronous signal separating circuit 11 and a time-base processing circuit 15 composed of a time-to-voltage conversion circuit 12, a correction circuit 13 and a voltage-to-time conversion circuit 14. Here, the vertical synchronous signal separating circuit 11 and the time-base processing circuit 15 constitute a vertical synchronous signal processing apparatus 16. A composite video signal containing a time-base fluctuation component $\Phi_i(t)$, representing a fluctuating vertical synchronous signal cycle period, is reproduced from the VTR 9. The video signals therein, having been subjected to the vertical synchronous signal elimination circuit 10 for eliminating the vertical synchronous signals, are fed to the mixer 17. The vertical synchronous signals separated from the vertical synchronous signal separation circuit 11 are used as gate pulses for the vertical synchronous signal elimination circuit 10 and are also fed to the time-base processing circuit 15. In the time-base processing circuit 15, the time-base fluctuation components of the vertical synchronous signals are converted to amplitude fluctuation components (namely voltages corresponding to time periods between respective adjacent vertical synchronous signals are produced) by the time-to-voltage conversion circuit 12 which produces signals having amplitudes corresponding to the cycles of the received vertical synchronous signals. The signals having been thus converted to amplitude fluctuation components, are fed to the next correction circuit 13. The correction circuit 13 is a circuit by which the input signals thereto are varied or corrected with respect to the amplitude and the phase thereof in correspondence with the frequency thereof. By design, the correction circuit can have any desired transfer characteristics (as to amplitude and phase). Thus, the output signals of the correction circuit 13 are signals which been further distorted from the amplitude fluction components which have been produced in correspondence with the time-base fluctuation components in the input composite video signal. The thus distorted signals are converted to time information signals by the voltage-to-time conversion circuit 14 so as to be shaped into a vertical synchronous signal wave. Therefore, the time-base processing circuit 15 functions to distort the input time-base fluctuation components $\Phi_i(t)$ to $\Phi_r(t)$ as its output. The vertical synchronous signals having been shaped by the vertical synchronous signal processing apparatus 16 are mixed with the video signals by the mixer 17, and the thus mixed composite signal is applied to the television receiver. Thereafter, in a manner similar to that described above with reference to FIG. 2, the video signals are applied unchanged to the cathode ray tube 3 in the form of the time-base fluctuation components $\Phi_i(t)$. The time-base fluctuation components $\Phi_r(t)$ of the vertical synchronous signals are distorted by the vertical deflection circuit 7, and supplied to the vertical deflection coil 8 of the cathode ray tube 3 in the form of time-base fluctuation components $\Phi_o(t)$. Here, it is evident from the afore-mentioned reasons that the condition which must be satisfied to prevent vertical picture fluctuations on the monitoring television screen is $\Phi_i(t) = \Phi_o(t)$.

Figure 4A:
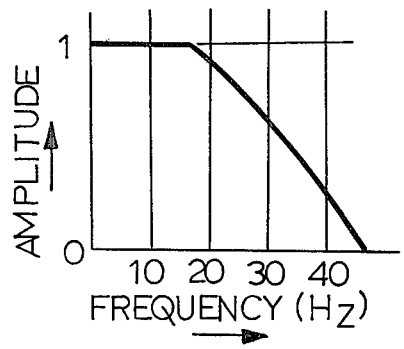
FIG. 4a shows the frequency response characteristics of a single stage low pass filter used for the correction circuit.
Figure 4B:
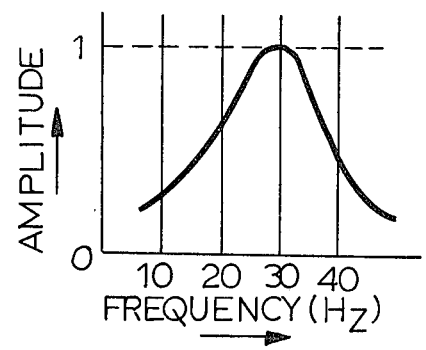
FIG. 4b shows the frequency response characteristics of a band pass filter used for the correction circuit.

Assuming that the transfer function of the vertical deflection circuit 7 of the television receiver with respect to the time-base fluctuation components is H(S), and the transfer function of the time-base processing circuit 15 with respect to the time-base fluctuation components is F(s), the relationship F(s)=1/H(S) is necessary for satisfying the above condition for preventing the vertical picture fluctuation. That is, the vertical picture fluctuation can be prevented or substantially prevented by selecting the transfer function of the time-base processing circuit 15 to be an inverse function or substantially an inverse function of the transfer function of the vertical deflection system of the television receiver. Furthermore, if a sawtooth wave generator generating similar waves to those generated by the vertical deflection signal oscillator 5 of the television receiver is used as the time-to-voltage conversion circuit 12, the transfer characteristics of the correction circuit 13 are only required to be complementary to the transfer characteristics of the vertical deflection signal amplifier 6, which can be easily realized. In order to completely eliminate the vertical picture fluctuation, the transfer characteristics, with respect to the time-base fluctuation components, of the vertical deflection signal amplifier 6 are required to be measured in detail, and the correction circuit should be completely complementary to the thus measured characteristics of the vertical deflection signal amplifier 6. However, according to applicants' experiments, it has been confirmed that fairly good results can be obtained by using a single stage resistance-capacitance low pass filter having the characteristics shown in FIG. 4a for the correction circuit. This is because among the various inherent characteristics of the vertical deflection signal amplifier 6 of a television receiver, the low band cut-off characteristics due to a.c. coupling (capacitive coupling or transformer coupling) largely affects the frequency characteristics thereof. Alternatively, by using a band pass filter having the frequency characteristics shown in FIG. 4b, for the correction circuit 13, and by selecting the center frequency thereof at around 30 Hz, more effective elimination of the vertical picture fluctuations can be performed.

Figure 5:
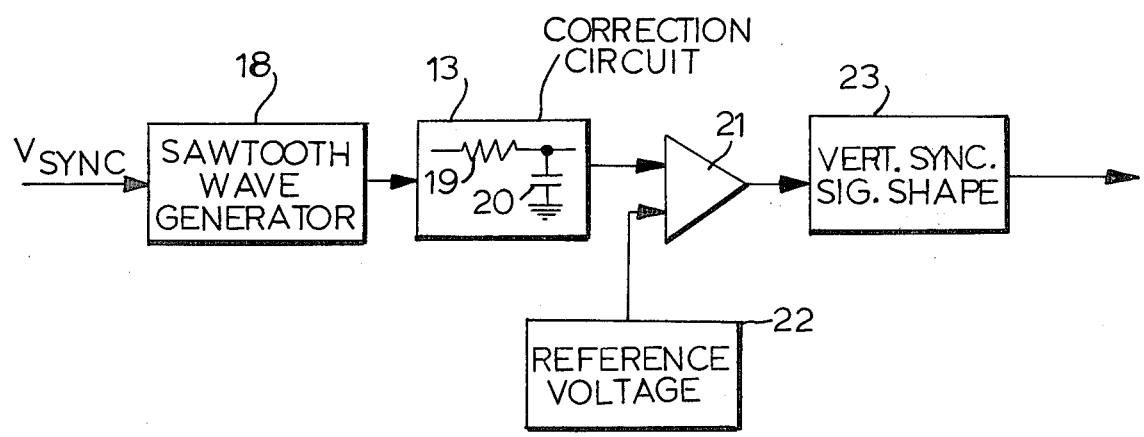
FIG. 5 is a block diagram of a time-base processing apparatus in accordance with the present invention.

FIG. 5 is a block diagram of an example of the time-base processing apparatus 15 usable for the present invention. Referring to FIG. 5, vertical synchronous signals are applied to the input of a sawtooth wave generator 18. This generator 18 initiates voltage-sweeping of each sawtooth upon receiving every input vertical synchronous signal so as to produce a so-called sawtooth wave, each sawtooth of which has a constant rising slope. The maximum voltage value of the generated sawtooth wave is proportional to the time period between adjacent input vertical synchronous signals. This sawtooth wave preferably has a waveform similar to that generated by the vertical deflection signal oscillator 5 of the television receiver. For example, it is particularly effective to design each sawtooth from the oscillator 18 to have a recovery time (falling time) corresponding to the blanking period, or to use for the oscillator 18 a blocking oscillator which is the same as that used the television receiver. The sawtooth wave driven by the input vertical synchronous signals is fed to the correction circuit 13, which distorts the waveform, e.g. by a single stage resistance-capacitance combination of a resistance 19 and a capacitance 20. Thereby, the time information in the input vertical synchronous signals are also affected. For picking up the thus affected time information, the corrected signal is input to a comparator 21. To the other input terminal of the comparator 21, a d.c. voltage is applied from a reference voltage source 22. So, the time points, as time information, where the voltage levels of the distorted sawtooth wave coincide with the voltage level determined by the reference voltage source, appear at the output of the comparator. (That is, the comparator produces signals or pulses at time points where the voltage levels of the distorted sawtooth wave coincide with the voltage level determined by the reference voltage source.) This time information is shaped to the form of vertical synchronous signals, having adjusted time periods, by a vertical synchronous signal shaping circuit 23 composed of a monostable multivibrator, for example. The thus obtained vertical synchronous signals are used as correcting signals for preventing the vertical picture fluctuation.

As described above in detail, upon slow motion reproduction, still picture reproduction and quick motion reproduction in a VTR, the reproduced vertical synchronous signals have variable time periods between adjacent ones thereof. Upon monitoring such reproduced vertical synchronous signals by a monitoring television, time-base fluctuation components are produced by the vertical deflection system of the television receiver. According to this invention, further time-base fluctuation components which are in an inverse relationship with the above time-base fluctuation components are preliminarily produced in the vertical synchronous signals according to a mechanism similar to the vertical deflection system of the television receiver. Thereby, both of the time-base fluctuation components and the further time-base fluctuation components supplied to the vertical deflection coil of the cathode ray tube cancel each other in the vertical deflection coil. Thereby, the time-base of the video signals coincide with that of the vertical synchronous signals, whereby the vertical picture fluctuation does not appear. Therefore, the slow motion reproduction and quick motion reproduction and the like without vertical picture fluctuation can be realized by a simple circuit arrangement, which is very effective.

In the above descriptions, the vertical synchronous signal processing apparatus is provided between a VTR and a monitoring television. However, it can be provided in the VTR so that the VTR produces output composite video signals having processed vertical synchronous signals, or can be provided in the television receiver.

What is claimed is:

1. A method of processing video signals, comprising: processing vertical synchronous signals in a composite video signal to be monitored by a television receiver, the time periods between adjacent ones of said vertical synchronous signals being variable; and supplying to the television receiver the composite video signal having substituted therein the thus processed vertical synchronous signals, said processing of the vertical synchronous signals being performed by a vertical synchronous signal processing apparatus comprising: a separation circuit for performing the step of separating the vertical synchronous signals from the composite video signal; a time-to-voltage conversion circuit for performing the step of converting the separated vertical synchronous signals to converted signals having amplitudes corresponding to the time periods between the vertical synchronous signals; a correction circuit for performing the step of correcting amplitudes and phases of the converted signals in accordance with the frequencies of the converted signals; and a voltage-to-time conversion circuit for performing the step of converting the information corresponding to the thus corrected amplitudes to time information; the composite video supplied to the television receiver formed by mixing a composite video signal without any vertical synchronous signals with the processed vertical synchronous signals.

2. A method of processing video signals according to claim 1, wherein said correction circuit has a transfer function which is an inverse function or substantially an inverse function of the transfer function of a vertical deflection circuit of the television receiver used for the monitoring.

3. A method of processing video signals according to claim 1, wherein said correction circuit is constructed of one of either a low pass filter or a band pass filter.

4. A method of processing video signals according to claim 1, wherein said vertical synchronous signal processing apparatus is included in either a video tape recorder or the television receiver.

5. A method of processing video signals, comprising: processing vertical synchronous signals in a composite video signal to be monitored by a television receiver, the time period between adjacent ones of said vertical synchronous signals being variable; and supplying to the television receiver the composite video signal having substituted therein the thus processed vertical synchronous signals, said processing of the vertical synchronous signals being performed by a vertical synchronous signal processing apparatus comprising: a separation circuit for performing the step of separating the vertical synchronous signals from the composite video signal; a time-to-voltage conversion circuit for performing the step of converting the separated vertical synchronous signals to converted signals having amplitudes corresponding to the time periods between the vertical synchronous signals; a correction circuit for performing the step of correcting amplitudes and phases of the converted signals in accordance with the frequencies of the converted signals; and a voltage-to-time conversion circuit for performing the step of converting the information corresponding to the thus corrected amplitudes to time information; the composite video supplied to the television receiver formed by mixing a composite video signal without any vertical synchronous signals with the processed vertical synchronous signals;

wherein said time-to-voltage conversion circuit is constructed for producing a sawtooth wave, the sweeping of each sawtooth of which is initiated by each of the vertical synchronous signals.

6. A method of processing video signals, comprising: processing vertical synchronous signals in a composite video signal to be monitored by a television receiver, the time periods between adjacent ones of said vertical synchronous signals being variable; and supplying to the television receiver the composite video signal having substituted therein the thus processed vertical synchronous signals, said processing of the vertical synchronous signals being preformed by a vertical synchronous signal processing apparatus comprising: a separation circuit for performing the step of separating the vertical synchronous signals from the composite video signal; a time-to-voltage conversion circuit for performing the step of converting the separated vertical synchronous signals to converted signals having amplitudes corresponding to the time periods between the vertical synchronous signals; a correction circuit for performing the step of correcting amplitudes and phases of the converted signals in accordance with the frequencies of the converted signals; and a voltage-to-time conversion circuit for performing the step of converting the information corresponding to the thus corrected amplitudes to time information; the composite video supplied to the television receiver formed by mixing a composite video signal without any vertical synchronous signals with the processed vertical synchronous signals;

wherein said voltage-to-time conversion circuit includes a comparator for performing the step of comparing output signals of the correction circuit with a d.c. reference signal.

* * * * *